Figure 1:
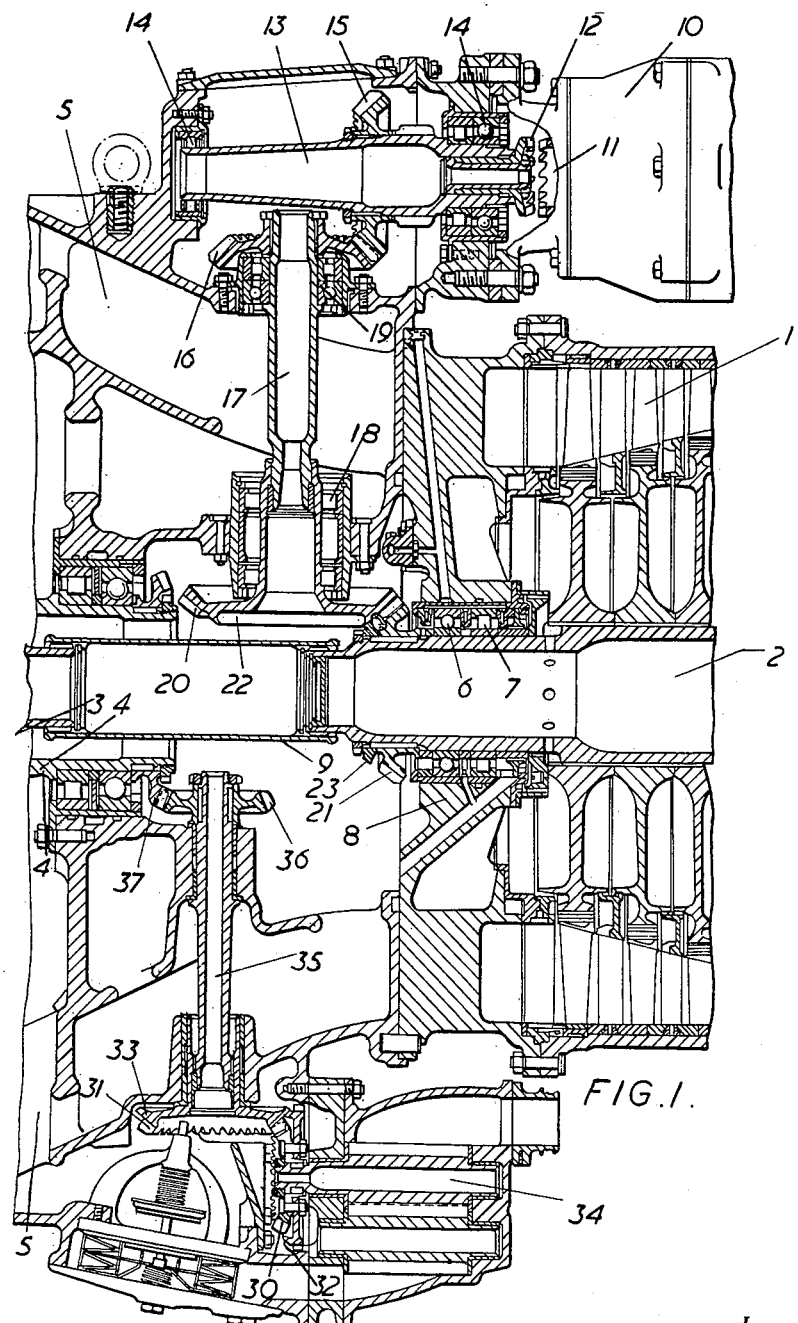

March 27, 1956 R. H. COLES 2,739,490
TRANSMISSION MECHANISM, INCLUDING BEVEL PINIONS
Filed Nov. 8, 1954 2 Sheets-Sheet 1

Inventor
Robert H. Coles

By Watson Cole,
Grindle & Watson
Attorneys

United States Patent Office 2,739,490
Patented Mar. 27, 1956

2,739,490

TRANSMISSION MECHANISM, INCLUDING BEVEL PINIONS

Robert Henry Coles, Chiswick, London, England, assignor to D. Napier & Son Limited, London, England, a company of Great Britain Application November 8, 1954, Serial No. 467,575

Claims priority, application Great Britain November 9, 1953

1 Claim. (Cl. 74—417)

This invention relates to transmission mechanism of the kind including intermeshing bevel pinions the teeth of which are of such form that when torque is transmitted in one direction through the mechanism from one pinion to the other in one direction of rotation the reaction between the meshing teeth of the pinions produces a resultant axial thrust tending to move one of the pinions (hereinafter referred to for convenience as the bevel gear) towards its cone centre.

Spiral bevel pinions having teeth with these characteristics are in themselves well known.

In transmission mechanism of the kind referred to according to the present invention, the bevel pinions or parts connected thereto are provided with thrust surfaces which are arranged to engage one another on or adjacent to the common contact line of the pitch cones of the two pinions, and thus serve to limit the movement of the bevel gear towards its cone centre, in these conditions, to maintain the correct mesh of the teeth.

The direction of the resultant axial thrust on the gear will also depend on whether the tooth spiral is left or right handed, on the direction of rotation of the pinions, and on the direction in which the torque is transmitted, that is to say whether the gear is the driving or driven member. If the teeth characteristics are such that the thrust on the gear is towards its cone centre in any one set of conditions the direction of the resultant thrust will be reversed if any one of these factors is reversed.

Thus if the form of the teeth of the pinions is such that when torque is transmitted in one direction, and in one direction of rotation, the resultant axial thrust on the gear is towards its cone centre, the thrust or the gear will be away from its cone centre if torque is transmitted in the reverse direction with the same direction of rotation.

It is an object of the invention to provide an improved, light, and compact transmission mechanism which is particularly applicable where torque is to be transmitted only, or mainly, in one direction and according to a preferred feature of the invention therefore, the bevel gear is supported externally by means, for example bearings, capable of resisting appreciable axial thrust only, if at all, in a direction away from the gear's cone centre.

The invention is particularly applicable to auxiliary drive transmission mechanism coupled to a prime mover, for example in an aircraft power plant of the gas turbine type, where weight must be reduced to a minimum, and in such case the bevel pinions may themselves constitute at least part of a reduction gear between the auxiliary unit and the prime mover.

Preferably the thrust surfaces on the pinions are frusto-conical and may be arranged to engage each other directly and to roll one upon the other.

In one preferred construction however one of the thrust surfaces, which is formed on a part integral with its associated bevel pinion, lies within the pitch cone of the pinion, while the other thrust surface is formed on a part separate from the other pinion and lies outside the pitch cone of that pinion.

In such case the thrust surface which lies within the pitch cone of its associated pinion, preferably lies on or within the root circle cone of the pinion.

The invention may be performed in various different ways but one specific embodiment as applied to transmission mechanism between auxiliary equipment and the turbo-compressor shaft of a gas turbine aircraft power unit will now be described by way of example with reference to the accompanying drawings.

Figure 2:
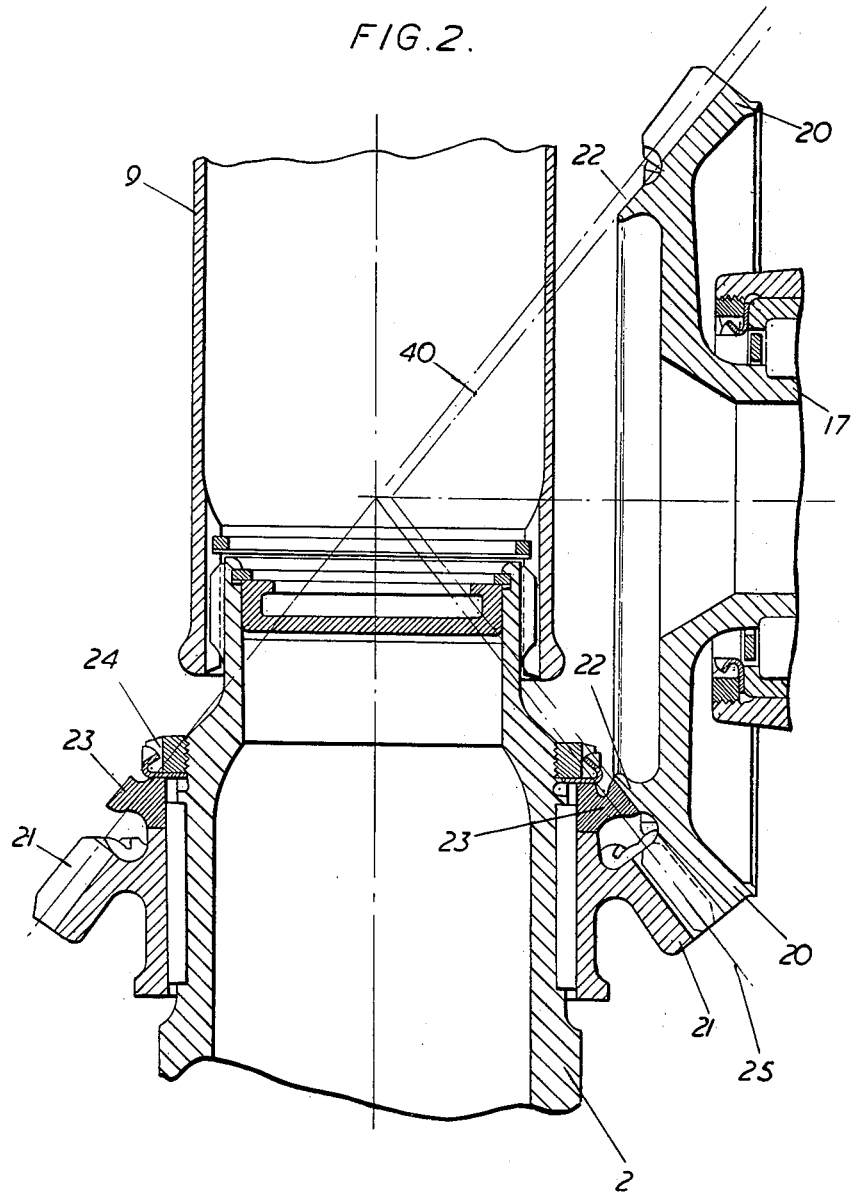

Figure 1 is a fragmentary sectional view through part of the engine, showing the forward end of the compressor and the transmission between the turbo-compressor shaft and an electric starter motor, and an oil pump, Figure 2 is an enlarged section view through the spiral bevel pinions included in the transmission drive between the turbo compressor shaft and the electric starter motor.

In this example illustrated the aircraft power unit comprises an axial flow compressor 1 mounted co-axially with an exhaust turbine (not shown) and connected for rotation therewith on a common shaft 2, the shaft 2 extending forwards at 3 and being connected to an aircraft propeller through a reduction gear (not shown). The reduction gear is of the epicyclic type and includes a sleeve 4 connected to the rotary spider of the gear, and thus driven at a speed somewhat slower than that of the shaft 3. Air is admitted to the compressor 1 through an annular duct 5 surrounding the reduction gear. The turbo-compressor rotor assembly is subject to substantial axial loads derived from the gas flow therethrough, and includes a fluid balancing piston and thrust bearings (not shown) capable of resisting any resultant thrust in either direction. The forward end of the compressor shaft 2 extends through a multiple bearing, including a ball bearing race 6 capable of resisting at least limited axial thrust, and a roller bearing race 7, supported from a part 8 of the casing of the power unit, and is splined to the rear end of a tubular shaft 9 connected to the input shaft 3 of the reduction gearing.

An electric starter motor 10 is mounted in the casing of the power unit adjacent the compressor 1 with its axis parallel to but spaced from the axis of the compressor. The shaft 11 of the starter motor is connected through a one-way dog clutch 12 to a fore-and-aft layshaft 13, supported between bearings 14 mounted on the casing, and a straight-toothed bevel pinion 15 mounted at an intermediate point on this layshaft 13 is arranged to mesh with a similar bevel pinion 16 on the outer end of a transverse layshaft 17, supported in bearings 18, 19, with its inner end adjacent the forward end of the compressor shaft 2. A spiral bevel pinion 20 (hereinafter referred to as the spiral gear) at the inner end of this transverse layshaft 17 meshes with a second spiral bevel pinion 21 mounted on the forward end of the compressor shaft 2 between the multiple bearing 6, 7, and the tubular transmission shaft 9, the spiral gear 20 having a greater number of teeth than the second spiral bevel pinion 21, so providing a reduction gear ratio between the starter motor 10 and the compressor shaft 2.

The teeth of the spiral bevel pinions 20, 21 are so formed that when torque is transmitted from the starter motor 10 to the compressor shaft 2, with the compressor shaft rotating in its normal direction of rotation, the resultant axial thrust on the spiral gear 20 caused by tooth reaction is in a direction away from its cone centre, that is to say away from the compressor shaft 2.

Each of the spiral bevel pinions 20, 21 is formed with or connected to an element 22, 23 with a frusto-conical thrust surface as best seen in Figure 2, the cone centres of these thrust surfaces being coincident or nearly so with the common pitch cone centre of the two bevel pinions. These frust-conical surfaces are arranged to engage each other approximately on the common contact line 25 of the pinion pitch cones when the teeth of the pinions are correctly in mesh, and thus act to hold the pinions in correct mesh and to prevent inward movement of the bevel gear in an axial direction towards its cone centre.

It will be desirable to be able to machine both elements 22, 23 in one piece with the pinions themselves, but if the surface of the respective element lies outside the pitch cone of the associated bevel pinion obvious difficulties arise in machining the dedendum portion of the bevel teeth within the pitch cone. In the illustrated preferred example the difficulty is overcome by arranging for the conical surface of the element 22 to lie slightly within the pitch cone of the bevel gear 20, and approximately on the root circle cone 40 of the gear, thus facilitating the machining of the gear teeth. The conical surface of the element 23 must accordingly lie outside the pitch cone of its associated bevel pinion 21, and accordingly, in order to facilitate the machining of the teeth of this pinion, the element 23 is made as a separate unit which is splined to the shaft 2 and held fixed in position by a clamping ring 24.

It will be understood that since the cooperating surfaces of the elements 22 and 23 do not lie on the pitch cones of the bevel pinions, the contact between the frusto-conical surfaces of the elements will not be of a true rolling type, and some degree of sliding will occur. This however will not be great since the contact between the surfaces is of very limited area, and is appreciably spaced from the common pitch cone centre of the gears, and is moreover only slightly displaced from the common pitch cone contact line 25. In fact the slight sliding action may have some advantage in assisting lubrication of the surfaces.

It will be understood also that by making both elements 22, 23, as separate units from their respective pinions, or by special machining operations, it may be possible to arrange for the conical surfaces of these elements to contact one another if desired exactly on the common pitch cone contact line 25, so as to eliminate sliding movement between the surfaces, and provide a true rolling engagement.

The transverse layshaft 17 extends through the annular air intake duct 5 and is supported at its inner and outer ends in the bearing assemblies 18, 19 including respectively two roller bearing races, and a roller bearing race combined with a ball bearing race. These bearing assemblies are incapable of resisting any appreciable axial thrust in a direction towards the compressor shaft 2, and only limited axial thrust in the opposite direction, and the bearings and supports therefor can therefore be of relatively light construction since the inward thrust is resisted by the frusto-conical thrust surfaces on the elements 22, 23.

Spiral bevel pinions 30, 31 with elements 32, 33, having frusto-conical thrust surfaces in accordance with the invention are also provided in the transmission to a gear type oil pump 34, driven from the turbo-compressor shaft. The transmission in this case includes a transverse layshaft 35 provided with a bevel pinion 36 at its inner end engaging a corresponding bevel pinion 37 connected to the rear end of the sleeve 4 forming part of the main reduction gearing. In this case however, the form of the bevel pinion teeth is such that the bevel gear 31 is urged by tooth reaction towards its cone centre when the direction of torque transmission is from the main turbo-compressor shaft 2 to the oil pump this being the normal direction of drive, as opposed to the arrangement above where the direction of torque transmission is from the starter motor 10 towards the turbo-compressor shaft 2. It will be noted also that in this case the frusto-conical elements 32, 33, are mounted on the sides of the respective pinions 30, 31, remote from the pinion pitch cone centres.

The invention provides a particularly convenient method of ensuring that the teeth of intermeshing bevel pinions are in correct mesh, since it is unnecessary to locate the shafts of both pinions axially, and provided that one shaft is located the other shaft will automatically locate itself when power is being transmitted.

What I claim and desire to secure by Letters Patent is:

Transmission mechanism comprising two inter-meshing spiral bevel pinions the teeth of which are of such form that when torque is transmitted in one direction through the mechanism from one pinion to the other in one direction of rotation, the reaction between the meshing teeth of the pinions produces a resultant axial thrust tending to move one of the pinions toward its cone center, each bevel pinion being connected for rotation with a thrust member, the two thrust members being arranged to engage one another adjacent the common contact line of the pitch cones of the two pinions, and in which one of the thrust members is formed integral with its associated pinion, the surface of this thrust member lying on or within the root circle cone of the pinion, while the other thrust member is formed as a separate part from its respective pinion, and with its surface lying outside the pitch cone of that pinion.

References Cited in the file of this patent
FOREIGN PATENTS
468,321    Germany _____ Nov. 10, 1928